(12) United States Patent
Mizuno (10) Patent No.: US 12,501,022 B2
(45) Date of Patent: Dec. 16, 2025

(54) ELECTRONIC APPARATUS, AND CONTROL METHOD FOR ELECTRONIC APPARATUS

(71) Applicant: CANON KABUSHIKI KAISHA, Tokyo (JP)

(72) Inventor: Nobutaka Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 18/462,527

(22) Filed: Sep. 7, 2023

(65) Prior Publication Data

US 2024/0089424 A1 Mar. 14, 2024

(30) Foreign Application Priority Data

Sep. 12, 2022 (JP) ................. 2022-144298

(51) Int. Cl.
*H04N 13/398* (2018.01)
*H04N 13/156* (2018.01)
*H04N 13/344* (2018.01)

(52) U.S. Cl.
CPC ......... *H04N 13/398* (2018.05); *H04N 13/156* (2018.05); *H04N 13/344* (2018.05)

(58) Field of Classification Search
CPC ........ G02B 2027/0138; G02B 27/0172; G02B 2027/014; G02B 27/017; G02B 2027/0134; H04N 13/239; H04N 13/128; H04N 13/122; H04N 2013/0081
See application file for complete search history.

(56) References Cited

U.S. PATENT DOCUMENTS

2018/0335635 A1* 11/2018 Yajima ............... G02B 27/0172

FOREIGN PATENT DOCUMENTS

JP 2009-043003 A 2/2009
JP 2012-204904 A 10/2012

* cited by examiner

*Primary Examiner* — Farhan Mahmud
(74) *Attorney, Agent, or Firm* — Cowan, Liebowitz & Latman, P.C, (57) ABSTRACT

An electronic apparatus includes a processor, and a memory storing a program which, when executed by the processor, causes the electronic apparatus to acquire a first image which is captured via a first optical system, and a second image which is captured via a second optical system, and which corresponds to the first image, and generate, by using the first image and the second image, a third image, and a fourth image which has parallax with respect to the third image and of which partial region included in the third image is magnified.

13 Claims, 5 Drawing Sheets

ELECTRONIC APPARATUS, AND CONTROL METHOD FOR ELECTRONIC APPARATUS

BACKGROUND OF THE INVENTION

Field of the Invention

The present invention relates to an electronic apparatus, a control method for the electronic apparatus, and a storage medium.

Description of the Related Art

In recent years, electronic apparatuses that capture and display images in real time and augment the visual information of humans are popular. Particularly in a head mounted display (TIMID) or the like to physically experience augmented reality (AR), users can experience virtual objects expressed in sizes and distances as if these objects actually existed in a real space.

According to a technique disclosed in Japanese Patent Application Publication No. 2012-204904, a human views an object using a right eye and a left eye focusing on different viewpoints, and perceives depth based on the difference of the distances of the object between the left and right eyes (binocular parallax), so as to view the object stereoscopically. Stereoscopic vision becomes possible by displaying a parallax image corresponding to binocular parallax.

In an HMID that displays a scene directly in front of the eyes of the user in real time, in some cases the user may desire to magnify a displayed image to check details.

If the magnified image is simply displayed on the display screen in such a case, the visual field range which the user has been viewing in the normal image narrows, and the user may have difficulty in recognizing the surroundings. Further, the user may experience discomfort with the magnified image, for which the sense of distance is lost due to the mismatch of parallax.

Regarding the magnified display of an image, Japanese Patent Application Publication No. 2009-43003, for example, discloses a technique to detect a line-of-sight of the user, magnify the region the user is gazing at, and display this magnified image superimposed on the general region that is being displayed. However, in Japanese Patent Application Publication No. 2009-43003, a case of magnifying an image in an electronic apparatus that displays parallax images is not considered.

SUMMARY OF THE INVENTION

With the foregoing in view, it is an object of the present invention to provide a method for displaying a magnified image appropriately for the user, in an electronic apparatus that displays images having parallax.

According to some embodiments, an electronic apparatus includes a processor, and a memory storing a program which, when executed by the processor, causes the electronic apparatus to acquire a first image which is captured via a first optical system, and a second image which is captured via a second optical system, and which corresponds to the first image, and generate, by using the first image and the second image, a third image, and a fourth image which has parallax with respect to the third image and of which partial region included in the third image is magnified.

According to some embodiments, a control method for an electronic apparatus includes an image acquiring step of acquiring a first image which is captured via a first optical system, and a second image which is captured via a second optical system and which corresponds to the first image, and an image generating step of generating, by using the first image and the second image, a third image, and a fourth image which has parallax with respect to the third image and of which partial region included in the third image is magnified.

Further features of the present invention will become apparent from the following description of exemplary embodiments with reference to the attached drawings.

DESCRIPTION OF THE EMBODIMENTS

Embodiments of the present disclosure will now be described with reference to the drawings. The present disclosure is not limited to the following embodiments, and may be changed when necessary within a scope not departing from the spirit thereof. In the drawings to be described below, composing elements having a same function are denoted with a same reference sign, and description thereof may be omitted or simplified. In the present embodiments, a case where the electronic apparatus is a head mounted display (stereoscopic imaging apparatus) will be described as an example.

Embodiment 1

Figure 1:
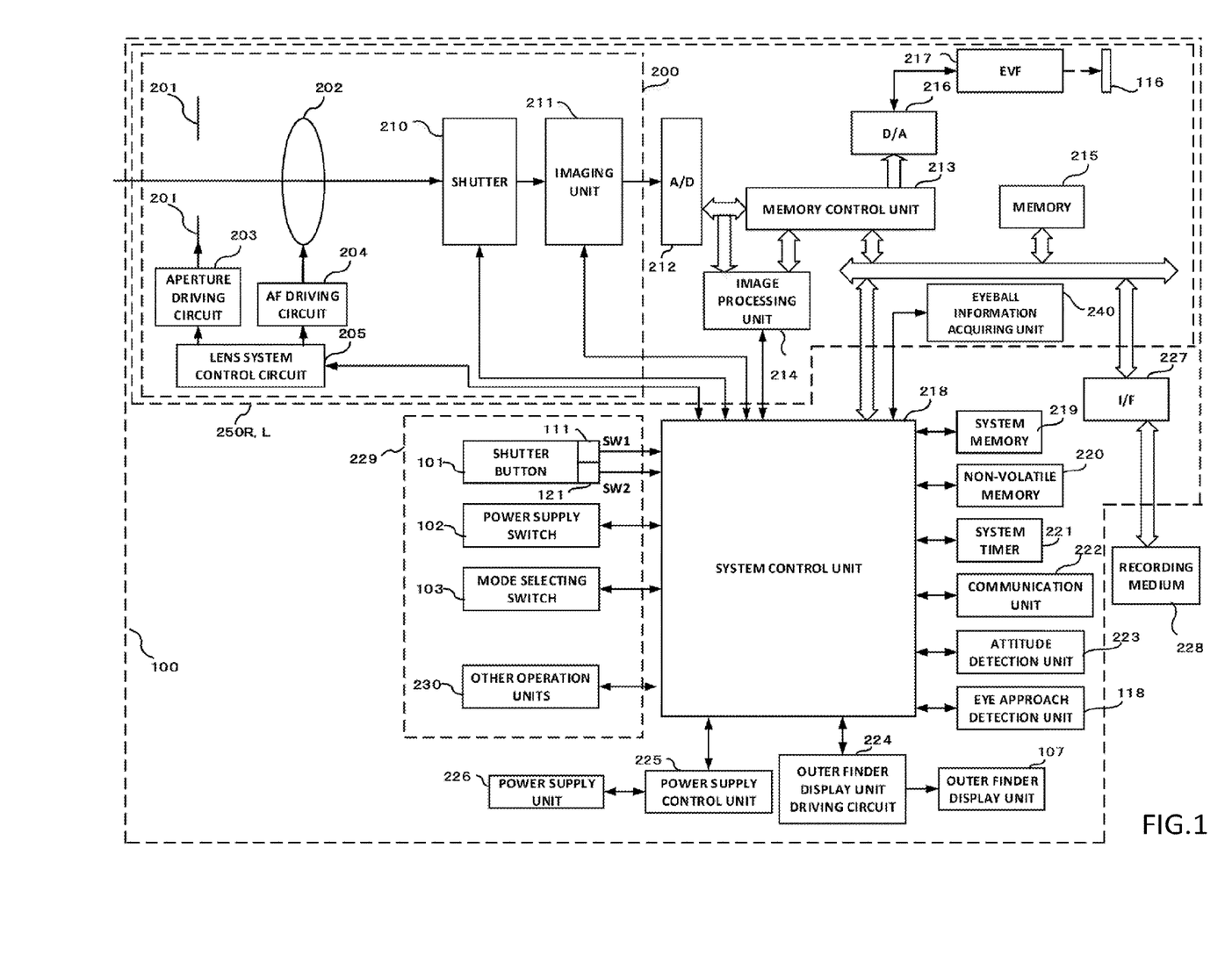
FIG. 1 is a diagram depicting an example of a system configuration of an HMD according to an embodiment.

(Configuration of head mounted display) FIG. 1 is a diagram depicting an example of a configuration of a head mounted display 100. The head mounted display 100 includes an imaging processing unit for the right eye 250R and an imaging processing unit for the left eye 250L. In the following description, the imaging processing units 250R and 250L may collectively be called an imaging processing unit 250.

The imaging processing unit 250 will be described first. The imaging processing unit 250 includes an aperture 201, and a lens 202 (the lens for the right eye 202 is a first optical system, and the lens for the left eye 202 is a second optical system). The imaging processing unit 250 also includes an aperture driving circuit 203, an auto focus (AF) driving circuit 204, a lens system control circuit 205, a shutter 210, and an imaging unit 211 (the imaging unit 211 for the right eye is a first light-receiving unit, and the imaging unit 211 for the left eye is a second light-receiving unit). Further, the imaging processing unit 250 includes an A/D convertor 212, a memory control unit 213, an image processing unit 214, a memory 215, A D/A convertor 216, and an EVF 217.

In the following description, the aperture 201, the lens 202, the aperture driving circuit 203, the AF driving circuit 204, the lens system control circuit 205, the shutter 210, and the imaging unit 211, which are used for image capturing of the imaging processing unit 250, is called an image capturing unit 200.

The aperture 201 is configured such that the aperture diameter is adjustable. The lens 202 is constituted of a plurality of lenses. The aperture driving circuit 203 controls the opening diameter of the aperture 201 so as to adjust the light quantity. The AF driving circuit 204 drives the lens 202 to perform focusing. The lens system control circuit 205 controls the aperture driving circuit 203, the AF driving circuit 204, and the like, based on instructions received from the later mentioned system control unit 218. The lens system control circuit 205 controls the aperture 201 via the aperture driving circuit 203, and performs focusing by changing the position of the lens 202 via the AF driving circuit 204.

The shutter 210 is a focal plane shutter that can freely control an exposure time of the imaging unit 211 based on the instruction received from the system control unit 218. The imaging unit 211 is an image pickup element (image sensor) constituted of a charge-coupled device (CCD), a complementary metal oxide semiconductor (CMOS) element, or the like, to convert an optical image into electric signals. The imaging unit 211 may include an imaging plane phase difference sensor, which outputs defocus amount information to the system control unit 218. The A/D convertor 212 converts analog signals, which are outputted from the imaging unit 211, into digital signals. The image processing unit 214 performs predetermined processing (e.g. pixel interpolation, resize processing (e.g. demagnification), color conversion processing) on data from the A/D convertor 212 or data from the memory control unit 213. The image processing unit 214 also performs predetermined arithmetic processing using the captured image data, and the system control unit 218 performs exposure control and distant measurement control based on the acquired arithmetic operation result. By this processing, through-the-lens (TTL) type AF processing, auto exposure (AE) processing, pre-flash emission (EF) processing, and the like are performed. Furthermore, the image processing unit 214 performs predetermined arithmetic processing using the captured image data, and performs TTL type auto white balance (AWB) processing based on the acquired arithmetic operation result. The image processing unit 214 is an example of the image acquiring unit that acquires a first image which is captured via the first optical system, and a second image which is captured via the second optical system, and which corresponds to the first image.

The image data received from the A/D convertor 212 is written to the memory 215 via the image processing unit 214 and the memory control unit 213; or the image data received from the A/D convertor 212 is written to the memory 215 via the memory control unit 213 without using the image processing unit 214. The memory 215 stores image data, which is acquired by the imaging unit 211 and converted into digital data by the A/D convertor 212, and image data to be displayed on the EVF 217. The memory 215 has a storage capacity that is sufficient for storing a predetermined number of still images and a predetermined duration of moving images and sounds. The memory 215 also plays a role of a memory for displaying images (video memory).

The D/A convertor 216 converts image data for display, which is stored in the memory 215, into analog signals, and supplies the analog signals to the display unit 108 and the EVF 217. Thus the image data for display, which is written in the memory 215, is displayed on the EVF 217 via the D/A convertor 216. The EVF 217 performs display in accordance with the analog signals received from the D/A convertor 216. The EVF 217 is, for example, such a display as an LCD and organic EL. The digital signals, which were A/D-converted by the A/D convertor 212 and stored in the memory 215, are converted into analog signals by the D/A convertor 216, and sequentially transferred to the EVF 217, whereby live view display is performed. The above is description on each component constituting the imaging processing unit 250.

The system control unit 218 is a control unit constituted of at least one processor and/or at least one circuit. In other words, the system control unit 218 may be a processor or a circuit, or may be a combination of a processing and a circuit. The system control unit 218 controls the head mounted display 100 in general. The system control unit 218 implements each processing step by executing programs recorded in a non-volatile memory 220. The system control unit 218 also performs display control by controlling the memory 215, the D/A convertor 216, the EVF 217, and the like.

The head mounted display 100 includes a system memory 219, the non-volatile memory 220, a system timer 221, a communication unit 222, an attitude detection unit 223, and an eye approach detection unit 118.

A random access memory (RAM) is used for the system memory 219, for example. In the system memory 219, constants and variables for operating the system control unit 218, programs read from the non-volatile memory 220, and the like are developed. The non-volatile memory 220 is an electrically erasable/recordable memory, and an electrically erasable programmable read only memory (EEPROM) is used, for example. In the non-volatile memory 220, constants, programs, and the like for operating of the system control unit 218 are recorded.

The system timer 221 is a timer unit to measure the time used for various controls, and to measure the time of the internal clock. The communication unit 222 performs transmission/reception of video signals and audio signals with an external apparatus connected wirelessly or via cable. The communication unit 222 is also connectable to a wireless local area network (LAN) or the Internet. Further, the communication unit 222 is communicable with an external apparatus via Bluetooth® or Bluetooth Low Energy. The communication unit 222 can send an image (including a live image) captured by the imaging unit 211 and an image recorded in a recording medium 228, and can receive image data and various other information from an external apparatus.

The attitude detection unit 223 detects an attitude of the head mounted display 100 with respect to the gravity direction. Based on the attitude detected by the attitude detection unit 223, the system control unit 218 can determine whether the image captured by the imaging unit 211 is an image captured when the head mounted display 100 is held horizontally, or an image captured when the head mounted display 100 is held vertically. The system control unit 218 can attach the orientation information, in accordance with the attitude detected by the attitude detection unit 223, to an image file of an image captured by the imaging unit 211, or can record the image in a rotated state. For the attitude detection unit 223, an acceleration sensor, a gyro sensor, or the like can be used, for example. The attitude detection unit 223 can also detect the motion of the head mounted display 100 (e.g. pan, tilt, lift, remain still).

The eye approach detection unit 118 detects approach of a certain object to an eyepiece 116 of an eyepiece finder 117 which includes the EVF 217. For the eye approach detection unit 118, an infrared proximity sensor can be used, for example. In case where an object is approaching, the infrared light emitted from an emitting portion of the eye approach detection unit 118 is reflected by the object, and is received by a receiving portion of the infrared proximity sensor. The eye approach detection unit 118 can determine the distance from the eyepiece 116 to the object by the amount of infrared light that is received. Thus the eye approach detection unit 118 performs eye approach detection that detects the distance of the approach of the object to the eyepiece 116. The eye approach detection unit 118 is an eye approach detection sensor that detects approach (contact) of an eye (object) to the eyepiece 116 of the eyepiece finder 117, and distancing (releasing) of the eye (object) from the eyepiece 116.

The eye approach detection unit 118 detects approach of an eye in a case where an object approaching the eyepiece 116 within a predetermined distance from the eyepiece 116 is detected after the non-eye contact state (non-eye approach state). The eye approach detection unit 118 detects release of an eye in a case where an object of which approach was detected is separated from the eyepiece 116 by more than a predetermined distance after the eye contact state (eye approach state). The threshold to detect eye approach and the threshold to detect eye release may be differentiated by setting hysteresis, for example. Here the eye approach detection unit 118 assumes that the eye approach state is from the detection of eye approach to the detection of eye release. The eye approach detection unit 118 also assumes that the non-eye approach state is from the detection of eye release to the detection of eye approach. The system control unit 218 switches display (display state)/non-display (non-display state) of the EVF 217 in accordance with the state detected by the eye approach detection unit 118. Specifically, in a case where the state is at least the image capturing standby state and the display destination switching setting is automatic switching, the system control unit 218 sets the EVF 217 to the non-display state.

During eye approaching, the system control unit 218 turns the display of the EVF 217 ON as the display destination. The eye approach detection unit 118 is not limited to the infrared proximity sensor, but may be another sensor if the sensor can detect the state of eye approach.

The head mounted display 100 also includes an outer finder display unit 107, an outer finder display driving circuit 224, a power supply control unit 225, a power supply unit 226, a recording medium I/F 227, and an operation unit 229.

The outer finder display unit 107 displays various set values, such as shutter speed, aperture value and ISO sensitivity. The outer finder display unit 107 is a liquid crystal display panel, for example, and corresponds to an example of the display unit. The outer finder display driving circuit 224 performs display control of the outer finder display unit 107 based on the instructions received from the system control unit 218.

The power supply control unit 225 is constituted of a battery detection circuit, a DC-DC convertor, a switch circuit to select a block to energize, and the like, and detects whether a battery is installed or not, a type of battery, and a residual amount of battery. The power supply control unit 225 also controls the DC-DC convertor based on these detection results and instructions received from the system control unit 218, and supplies the required voltage to each unit, including the recording medium 228, for a required period of time. The power supply unit 226 is constituted of a primary battery (e.g. alkali battery, lithium battery), a secondary battery (e.g. NiCd battery, NiNM battery, Li battery), an AC adapter, and the like.

The recording medium I/F 227 is an interface with the recording medium 228, such as a memory card and a hard disk. The recording medium 228 is a memory card, for example, to record captured images, and is constituted of a semiconductor memory, a magnetic disk, or the like. The recording medium 228 may be removable or may be embedded in the head mounted display 100.

The operation unit 229 is an input unit to receive an operation performed by the user (user operation), and is used to input various instructions to the system control unit 218. The operation unit 229 includes a shutter button 101, a power supply switch 102, a mode selecting switch 103, and other operation units 230. The other operation units 230 include an electronic dial, a direction key, a menu button, and the like.

The shutter button 101 includes a first shutter switch 111 and a second shutter switch 121. The first shutter switch 111 turns ON in mid-operation of the shutter button 101, that is, in the half-depressed state (image capturing preparation instruction), and generates a first shutter switch signal SW1. In accordance with the first shutter switch signal SW1, the system control unit 218 starts such image capturing preparation processing as AF processing, AE processing, AWB processing and EF processing.

The second shutter switch 121 turns ON when operation of the shutter button 101 is completed, that is, in the fully depressed state (image capturing instruction), and generates a second shutter switch signal SW2. In accordance with the second shutter switch signal SW2, the system control unit 218 starts a series of image capturing processing, from a step of reading signals from the imaging unit 211 to a step of generating an image file, including the captured images, and writing the image file to the recording medium 228.

The mode selecting switch 103 switches the operation mode of the system control unit 218 to one of an image capturing/display mode, a reproduction mode, an AR display mode, and the like. Using the mode selecting switch 103, the user can directly switch the operation mode to one of the above mentioned image capturing modes. The user may also select an image capturing mode list screen first using the mode selecting switch 103, then select one of a plurality of modes displayed thereon using the operation unit 229.

Figure 2:
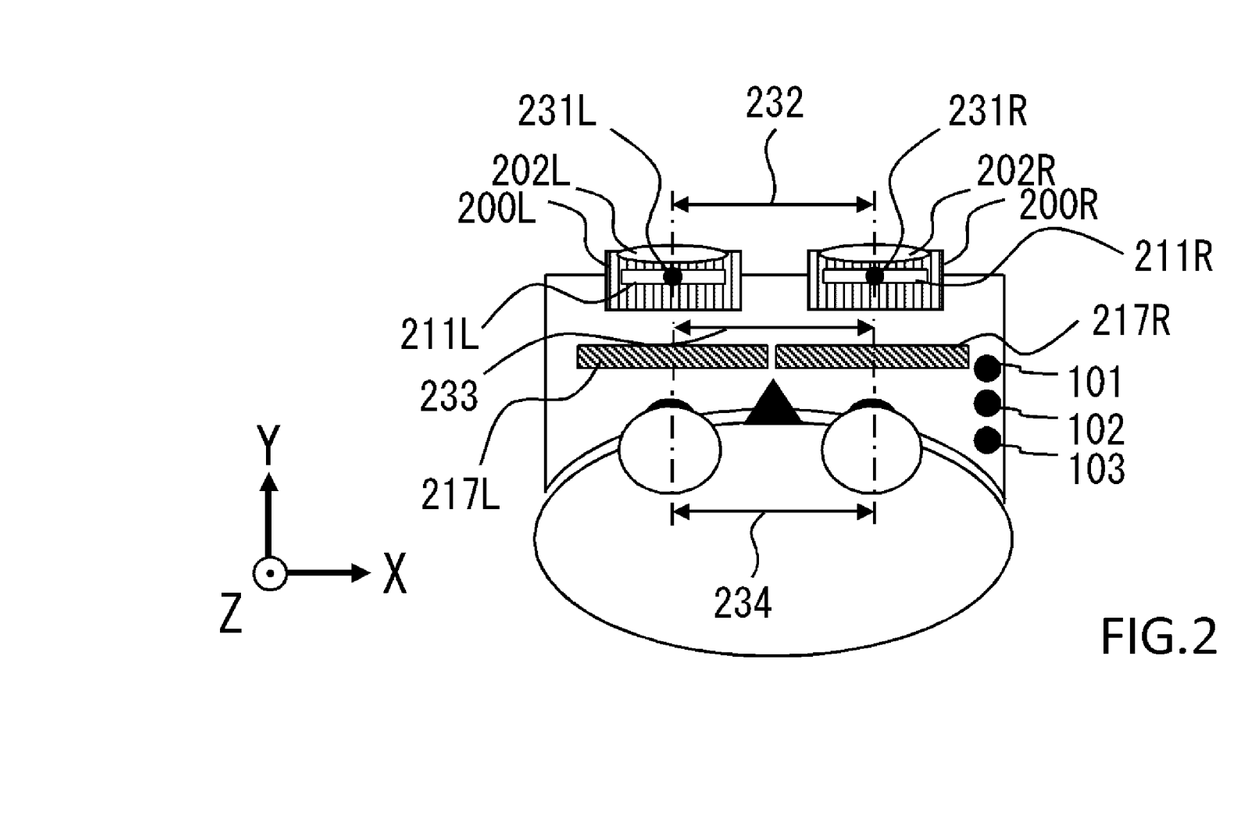
FIG. 2 is a schematic diagram depicting an example of a configuration of the HMD according to the embodiment.

(Configuration of head mounted display) FIG. 2 is a schematic diagram depicting an example in a case where a user wears the head mounted display 100. A composing element of the head mounted display 100 in FIG. 2 the same as a composing element described in FIG. 1 is denoted with a same reference sign, and description thereof will be omitted.

As illustrated in FIG. 2, the head mounted display 100 includes rotation adjusting units 231R/L (convergence angle adjusting unit) which correspond to image capturing units 200 R/L respectively. By the image capturing units 200 R/L rotating the rotation adjusting units 231 R/L respectively in the Yaw direction around the Z axis direction, the convergence angle of the captured image is adjusted.

FIG. 2 also indicates an optical axis distance 232 between the imaging processing unit for the right eye 250R and the imaging processing unit for the left eye 250L in a state where the user wearing the head mounted display 100 is viewed in the Z axis direction. The optical axis distance 232 can be adjusted by an adjusting mechanism (not illustrated).

Further, FIG. 2 indicates an eyeball distance 234 of the user in the state where the user wearing the head mounted display 100 is viewed in the Z axis direction. Furthermore, FIG. 2 indicates an EVF distance 233, which is a distance between an EVF for the right eye 217R and an EVF for the left eye 217L in the state where the user wearing the head mounted display 100 is viewed in the Z axis direction. The eyeball distance 234 of a human varies depending on the person, hence it is preferable that the EVF distance 233 is also adjustable in the head mounted display 100. Therefore in the following description, it is assumed that the EVF distance 233 can be changed using an adjusting mechanism (not illustrated).

Figure 3A:
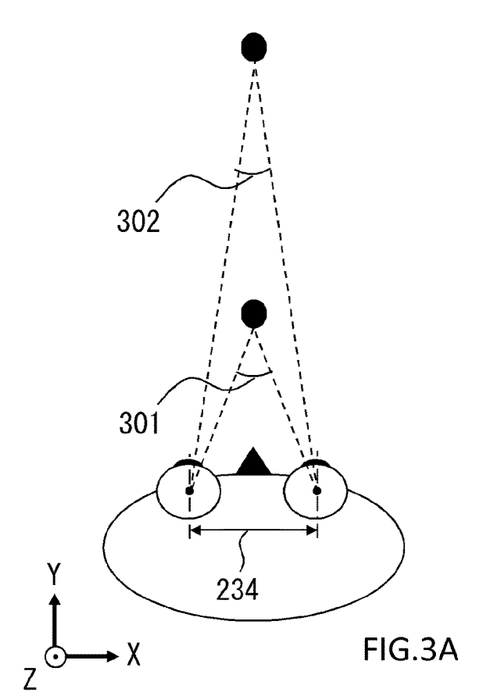
FIGS. 3A to 3C are diagrams for describing a difference of a convergence angle caused by the difference of the distance between the user and an object.

(Change of convergence angle depending on object distance) FIG. 3A is a diagram depicting a difference of a convergence angle depending on the difference of the distance from the eyeballs of the user to an object. FIG. 3A indicates an example of the eyeball distance 234 of the user, a convergence angle 301 in a state where the user is viewing a closer object, and a convergence angle 302 in a state where the user is viewing a more distant object. As illustrated in FIG. 3A, comparing the convergence angles 301 and 302, the convergence angle is larger when the user is viewing a closer object than when the user is viewing a more distant object. A human senses this difference of the convergence angles depending on the change of the distance as a sense of distance.

In images using AR, display may be changed in accordance with the distance between a virtual object and the user. Especially in a case where the user is playing sports or is experiencing sightseeing in AR, it is better to reproduce the sense of distance from the user to the object, since the user can experience a sense of immersion without having an unnatural feeling. Therefore in the head mounted display 100 as well, it is desirable to provide 3D images that are close to the sense of distance of the user.

In order to provide 3D images in which the sense of distance between the user and the object is reproduced, it is desirable to match the eyeball distance 234 and the optical axis distance 232 indicated in FIG. 2 first, then perform display control using a convergence angle in accordance with the distance between the user and the object. To acquire various distance information in the head mounted display 100, a conventionally known common method (e.g. LIADR) can be used. In the head mounted display 100, besides manually adjusting the optical axis distance 232 so as to match with the eyeball distance 234 of the user, the optical axis distance 232 may automatically be adjusted by acquiring the information on line-of-sight positions of the left and right eyes, and calculating the eyeball distance from the information on the line-of-sight positions.

Figure 3B:
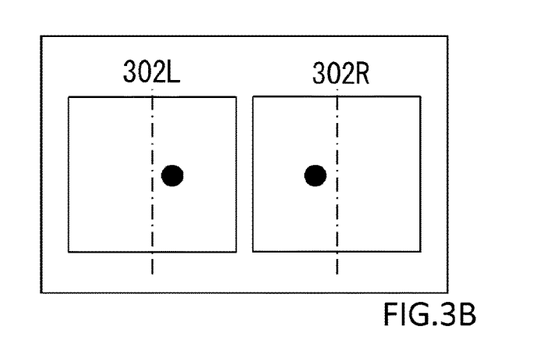
Figure 3C:
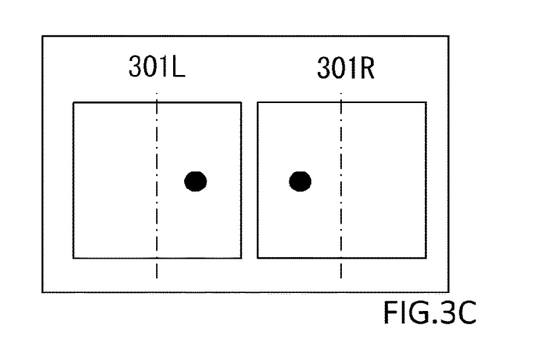

(Parallax image) The sense of distance of the user who is wearing the head mounted display 100 is determined by images displayed on the EVF for the right eye 217R and the EVF for the left eye 217L. FIG. 3B indicates an example of an image for the left eye 302L and an image for the right eye 302R of an object located relatively far when the user is viewing infinity. Further, FIG. 3C indicates an image for the left eye 301L and an image for the right eye 301R of an object located relatively close when the user is viewing infinity. As illustrated in FIGS. 3B and 3C, the parallax is smaller as the distance to the object is farther, and the parallax is larger as the distance to the object is closer, and based on the difference in the parallax, the user senses the distance to the object.

Figure 4A:
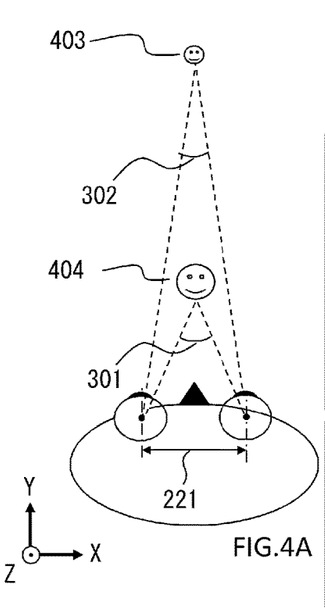
FIGS. 4A to 4D are diagrams depicting an example of image display on the HMD according to the embodiment.
Figure 4B:
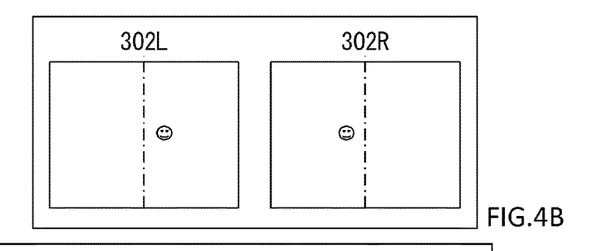

(Display of magnified image) In some cases, in the head mounted display 100 that displays a scene directly in front of the eyes in real time, the user may desire to see details by magnifying the image currently displayed. FIGS. 4A to 4D indicate display examples of the image for the left eye and the image for the right eye with respect to a distance between a user and an object. As illustrated in FIGS. 4A and 4B, in a case where the distance between the user and the object is relatively far, the parallax is small, and the object that is displayed in the image tends to be small. In this case, if a simply magnified image is displayed on the display image, the visual field range decreases compared with the display before magnification, hence the user may no longer recognize the surroundings in the display image. Further, in the image generated by simply magnifying the display image, the parallaxes before and after the magnification do not match, hence the sense of distance is diminished when the user views the magnified display image, and the user may start to feel sick.

Figure 4C:
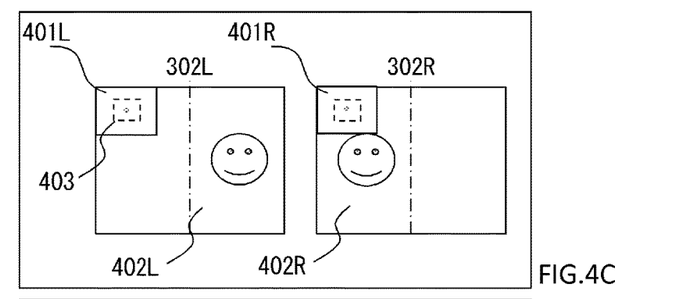

Therefore in the head mounted display 100 of Embodiment 1, as illustrated in FIG. 4C, a general image (third image) and a magnified image (fourth image) which is generated by magnifying a partial region of the general image, are simultaneously displayed on the EVF 217, and the parallaxes are differentiated between the general image and the magnified image, so that the user can easily distinguish between the general image and the magnified image. In the display example in FIG. 4C, a general image 401 to recognize the general view is displayed on the image for the left eye and the image for the right eye respectively. In this case, the general image 401L displayed for the left eye and the general image 401R displayed for the right eye are identical images, and have no parallax, therefore the user recognizes the general images 401L and 401R as being disposed on the infinity side. By displaying the general image on the EVF 217, the visual field range of the user can be secured, and further, by displaying an index 403 that indicates the region of the magnified image in the general image, the user has support to recognize the magnified area of the image in the general image. It is preferable that the general image that is displayed when the magnified image is displayed is generated from a normal image 301L for the left eye, and a normal image 301R for the right eye. For the general image that is displayed when the magnified image is displayed, one panoramic image generated from the normal images 301L and 301R, or one of the normal images 301L and 301R may be used. The range which the user is viewing is different between the image for the left eye and the image for the right eye, that is, the left eye lacks the relatively right side range, and the right eye lacks the relatively left side range. Therefore an image complimenting the normal images 301L and 301R with each other can be acquired as the general image if the panoramic image generated by combining the normal images 301L and 301R is used.

The magnified image 402L for the left eye and the magnified image 402R for the right eye are displayed on the EVF 217 as the magnified image. In the magnified images 402L and 402R, the parallax is larger than the general image, based on the assumption that the object exists at a position 404 in accordance with the magnification ratio with respect to the general image. For example, controlling each component of the head mounted display 100, the system control unit 218 determines the parallax in the magnified image based on the parallax in the general image and the magnification ratio of the magnified image with respect to the general image, and generates the magnified images 402L and 402R using the determined parallax. Thereby the user can view the object at a closer distance.

Figure 4D:
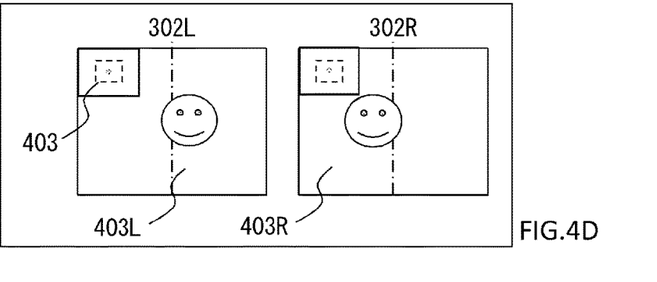

In the above mentioned display of the magnified image, the parallax in the magnified image is set based on the assumption that the object exists at a closer distance by the amount of magnifying the general image. However, as another display method for the magnified image, it may be displayed such that the object appears as magnified in the magnified image, without changing the distance from the user to the object between the general image and the magnified image. Then in EVF 217, the magnified image is displayed for the left eye and the right eye respectively, without changing the parallax of the left and right eyes in the magnified image, while displaying the general image. FIG. 4D is a display example of the magnified image using this different display method for the magnified image. In FIG. 4D, the parallax between the magnified image 403L for the left eye and the magnified image 403R for the right eye is the same as the parallax in the display of the normal display, hence the sense of distance of the user to the object in this display is consistent between the general image and the magnified image.

In the present embodiment, in some cases it may be better for the user to recognize that the object in the general image is at a closer distance than the object in the magnified image, depending on the intended use of the magnified image. In this case, the system control unit 218 controls each component of the head mounted display 100 so that the parallax in the general image becomes larger than the parallax in the magnified image, while maintaining the parallax in the magnified image to be the same as the parallax in the normal image. The system control unit 218 here is an example of the image generating unit that generates at least one of a general image and a magnified image of which parallax is different from the general image, using the first image and the second image.

(Display format of magnified image) In the head mounted display 100 of the present embodiment, the following display formats can be used as examples of the display formats of the magnified image on the EVF 217.

always magnify the center region of the general image
 magnify a region, which includes the object detection position, in the general image
 magnify a region, which includes a position specified by the user, in the general image In the present embodiment, information on display formats that can be executed in the head mounted display 100 is displayed on the EVF 217 and on the outer finder display unit 104, and the user selects a display format using the operation unit 229, whereby a magnified image can be displayed in the selected format. In the head mounted display 100, the index 403, which indicates the region of the magnified image, is displayed on the general image, as illustrated in the examples in FIGS. 4C and 4D, regardless which of the above mentioned display formats is used. Thereby the user can check the magnified image while recognizing the position of the object in the general image.

In the head mounted display 100, in the case of displaying a magnified image using the object detection position in the general image, the system control unit 218 controls each component, and detects a specific object, such as a face of a person and an animal, in the general image. Further, in the case where the detected object moves, the system control unit 218 may control each component so as to continue displaying the magnified image such that the object is located at the center of the magnified image. Furthermore, in the head mounted display 100, the method for the user specifying a position may be a method for detecting the line-of-sight of the user and magnifying an area that is being viewed, or a method for specifying the magnified position using such a member as a cross key.

(Image display method) As described above, in the head mounted display 100 of the present embodiment, the parallax is set such that the user can recognize that an object in the magnified image is located at a closer distance than the object in the general image. Thereby the object in the magnified image is displayed on the EVF 217 with more emphasis than the object in the general image. The following display formats can be used, for example, as the display format of emphasizing the object in the magnified image than the object in the general image.

setting the brightness of the object in the magnified image to be higher than the brightness of the object in the general image
 displaying the object in the magnified image to be larger than the object in the general image
 displaying the general image at any corner of the display region on the EVF 217

For example, in the case of the display example in FIG. 4C, the parallax in the magnified images is set to be larger than the parallax in the general images, and the general image is displayed at the upper left corner of the rectangular display region of the EVF 217. Thereby the user can check the object in the magnified image that is more emphasized than the object in the general image, while checking the surroundings of the object in the general image.

Figure 5A:
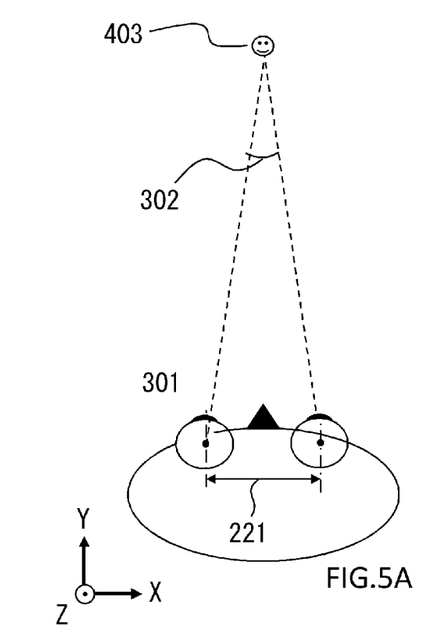
FIGS. 5A to 5C are diagrams depicting another example of image display on the HMD according to the embodiment.
Figure 5B:
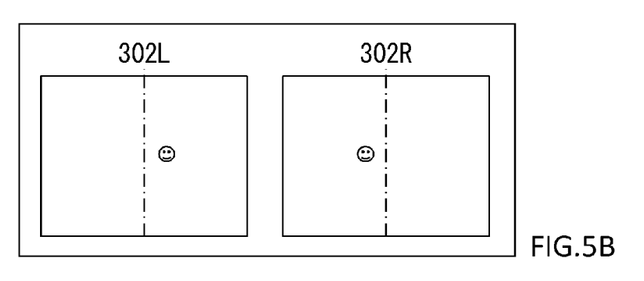
Figure 5C:
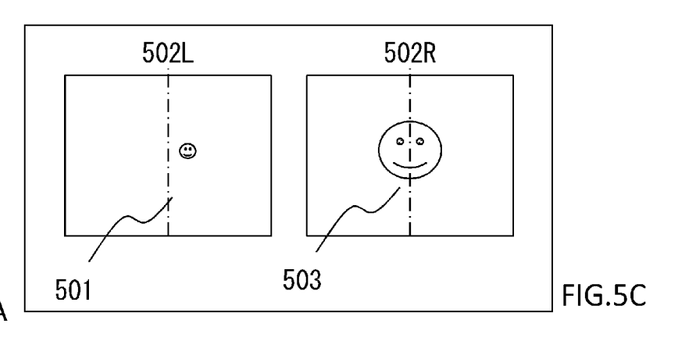

In the head mounted display 100, the preferred setting of an image display may be different depending on the user. In such a display device, choices for the following settings may be provided, so that the setting content is displayed on the EVF 217 and the user can select a preferred setting. This improves the usability of the head mounted display 100.

user can select parallax in the magnified image and parallax in the general image
 user can set brightness of the magnified image and brightness of the general image
 user can select display positions/sizes of the magnified image and the general image (Other display methods) FIG. 5 indicates another display method of the general image and the magnified image. In FIG. 5, a general image 501 is displayed on an image 502L or the left eye, and a magnified image 503 is displayed on an image 502R for the right eye. In this case, as the image acquiring unit, the image processing unit 214 acquires a first parallax image for the right eye captured via the first optical system, and acquires a second parallax image for the left eye captured via the second optical system. Then as the image generating unit, the system control unit 218 generates a magnified image by magnifying one of the first parallax image and the second parallax image, and generates a general image using the other one of the first parallax image and the second parallax image. Then as illustrated in FIG. 5, the magnified image is displayed for one eye and the general image is displayed for the other eye on the EVF 217, whereby even when the magnified image is displayed, the user can view the area of interest in the magnified state, while recognizing the general image. To select a magnified image, the above mentioned method may be used, but a conventionally used common method may also be used.

As described above, according to the present embodiment, the generation of black float and the generation of a gradation step difference in a spot light region can be reduced in a projected spotlight image.

While an electronic apparatus in the present disclosure has been described in detail based on preferred embodiments thereof, the present disclosure is not limited to these specific embodiments, but includes various modes within a scope not departing from the technical spirit of the present disclosure. The above mentioned plurality of embodiments may be combined as required. For example, in the above embodiments, the electronic apparatus is the HMD 100, but may be a personal computer (PC), or the like, which is connected to the HMD 100, and has at least some of the functions of the HMD 100.

The present invention also includes a case where software programs, to implement the functions of the above embodiments, are supplied to a system or to an apparatus having a computer that can execute the programs, directly from a recording medium or via cable/wireless communication, and the programs are executed thereby. Therefore program codes to be supplied to and installed on a computer, to implement the functional processing of the present invention using the computer, also implement the present invention. In other words, the computer programs, to implement the functional processing of the present invention, are also included in the present invention. In this case, the formats of the programs do not matter, such as the object codes, programs executed by an interpreter, and script data to be supplied to the OS, as long as the programs have the above mentioned functions of the programs. The recording medium to supply the programs may be, for example, a hard disk, a magnetic recording medium (e.g. magnetic tape), an optical/magneto optical recording medium, a non-volatile semiconductor memory, or the like. The method for supplying the programs may be, for example, storing the computer programs implementing the present invention on a server of a computer network, and a connected client computer downloading the computer programs.

Each functional unit of each embodiment (each modification) mentioned above may or may not be independent hardware. The functions of at least two functional units may be implemented by common hardware. Each of a plurality of functions of one functional unit may be implemented by independent hardware. At least two functions of one functional unit may be implemented by common hardware. Each functional unit may or may not be implemented by such hardware as ASIC, FPGA and DSP. For example, the apparatus may include a processor and a memory (storage medium) in which a control program is stored. Further, the functions of at least part of the functional units of the apparatus may be implemented by the processor reading the control program from the memory, and executing the program.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, a method for displaying a magnified image appropriately for the user can be provided in the electronic apparatus that displays images having parallax.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-144298, filed on Sep. 12, 2022, which is hereby incorporated by reference herein in its entirety.

What is claimed is:

1. An electronic apparatus comprising:
a processor; and
a memory storing a program which, when executed by the processor, causes the electronic apparatus to
acquire a first image which is captured via a first optical system, and a second image which is captured via a second optical system, and which corresponds to the first image, and
generate, by using the first image and the second image, a third image, and a fourth image which has parallax with respect to the third image and of which a partial region included in the third image is magnified;
wherein the parallax of the fourth image is determined based on parallax of the third image and a magnification ratio of the fourth image with respect to the third image.

2. The electronic apparatus according to claim 1, wherein the first image is a parallax image for the right eye, and the second image is a parallax image for the left eye.

3. The electronic apparatus according to claim 2, wherein the program which, when executed by the processor, further causes the electronic apparatus to generate one image, as the third image, from the first image and the second image.

4. The electronic apparatus according to claim 1, wherein the third image includes a third image for the right eye and a third image for the left eye,
the fourth image includes a fourth image for the right eye and a fourth image for the left eye, and
the parallax between the fourth image for the right eye and the fourth image for the left eye is larger than the parallax between the third image for the right eye and the third image for the left eye.

5. The electronic apparatus according to claim 1, wherein the third image includes a third image for the right eye and a third image for the left eye,
the fourth image includes a fourth image for the right eye and a fourth image for the left eye, and
the parallax between the fourth image for the right eye and the fourth image for the left eye is smaller than the parallax between the third image for the right eye and the third image for the left eye.

6. The electronic apparatus according to claim 1, wherein the program which, when executed by the processor, further causes the electronic apparatus to control such that an index to indicate the partial region corresponding to the fourth image is displayed in the third image.

7. The electronic apparatus according to claim 1, wherein
the fourth image includes a fourth image for the right eye and a fourth image for the left eye, and
the program which, when executed by the processor, further causes the electronic apparatus to change the parallax between the fourth image for the right eye and the fourth image for the left eye in accordance with the magnification ratio of the fourth image with respect to the third image.

8. The electronic apparatus according to claim 1, wherein
the third image is generated based on the first image, and
the fourth image is generated based on the second image.

9. The electronic apparatus according to claim 8, further comprising display means configured to display one of the third image and the fourth image as an image for the right eye, and to display the other of the third image and the fourth image as an image for the left eye.

10. The electronic apparatus according to claim 1, wherein the partial region comprises an object detection position.

11. The electronic apparatus according to claim 1, wherein the partial region is a position in the first image specified by a user.

12. The electronic apparatus according to claim 1, wherein
the program which, when executed by the processor, further causes the electronic apparatus to display the third image and the fourth image, simultaneously, on a display.

13. A control method for an electronic apparatus, the method comprising:
an image acquiring step of acquiring a first image which is captured via a first optical system, and a second image which is captured via a second optical system and which corresponds to the first image; and
an image generating step of generating, by using the first image and the second image, a third image, and a fourth image which has parallax with respect to the third image and of which a partial region included in the third image is magnified;
wherein the parallax of the fourth image is determined based on parallax of the third image and a magnification ratio of the fourth image with respect to the third image.

* * * * *